United States Patent [19]

Allred et al.

[11] Patent Number: 4,607,608

[45] Date of Patent: Aug. 26, 1986

[54] CAMPFIRE COOKING GRILL

[76] Inventors: Von D. Allred; Mark Allred, both of P.O. Box 24, Afton, Wyo. 83110

[21] Appl. No.: 739,850

[22] Filed: May 31, 1985

[51] Int. Cl.[4] .............................................. F24B 3/00
[52] U.S. Cl. ................................... 126/30; 126/25 A; 99/339; 248/156
[58] Field of Search ...................... 126/9 R, 9 B, 25 A, 126/29, 30, 137; 248/156, 295.1, 409; 99/339, 376, 422, 449, 450, 340

[56] References Cited

U.S. PATENT DOCUMENTS

| | | | |
|---|---|---|---|
| 2,827,846 | 3/1958 | Karkling | 126/30 |
| 2,844,139 | 7/1958 | Lucas | 126/30 |
| 2,940,439 | 6/1960 | Bartels et al. | 126/30 |
| 3,064,637 | 11/1962 | Thomson | 99/340 X |
| 3,095,869 | 7/1963 | Swenson | 126/25 A |
| 3,111,123 | 11/1963 | Le Fort | 126/137 |
| 3,162,113 | 12/1964 | Tallaksen | 126/30 X |
| 3,359,887 | 12/1967 | Cleveland | 99/421 |
| 4,083,354 | 4/1978 | Claire et al. | 126/30 |
| 4,096,951 | 6/1978 | Menssen | 248/156 X |
| 4,117,825 | 10/1978 | Robertson | 126/29 |
| 4,363,313 | 12/1982 | Smith | 126/9 R |
| 4,437,450 | 3/1984 | Connelly | 126/30 |
| 4,476,848 | 10/1984 | Protas | 99/340 X |
| 4,538,589 | 9/1985 | Preston | 126/30 |
| 4,553,525 | 11/1985 | Ruble | 126/30 |

Primary Examiner—Margaret A. Focarino
Attorney, Agent, or Firm—Hill, Van Santen, Steadman & Simpson

[57] ABSTRACT

A campfire griddle or grill which is designed for convenience and cooking over a campfire. A metal support in the form of a stake is driven into the ground by stepping on a foot pad and the griddle handle is then placed over the stake and lowered to the desired height. The handle can be adjusted to different heights by depressing the safety latch while lowering and the griddle can be swung away from the fire as desired. The griddle itself can easily be attached or removed from the handle. It can also be used alone on a camp stove if desired. A charcoal pan can also be attached to the stake under the griddle so that charcoal can be placed in such charcoal pan to heat the griddle or grill after it has been placed on the supporting stand.

3 Claims, 5 Drawing Figures

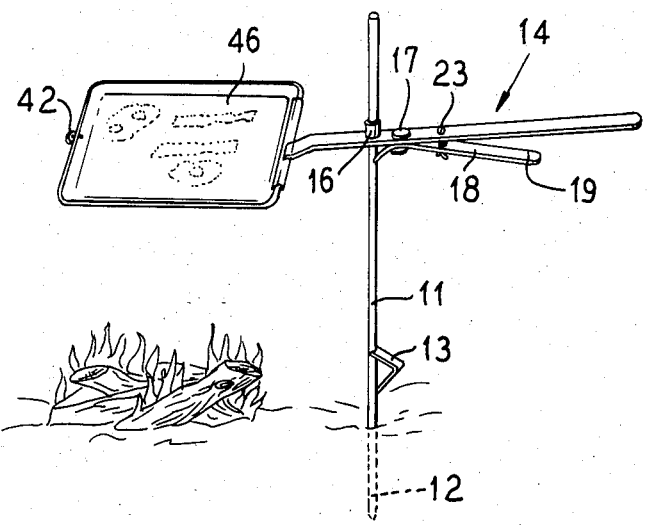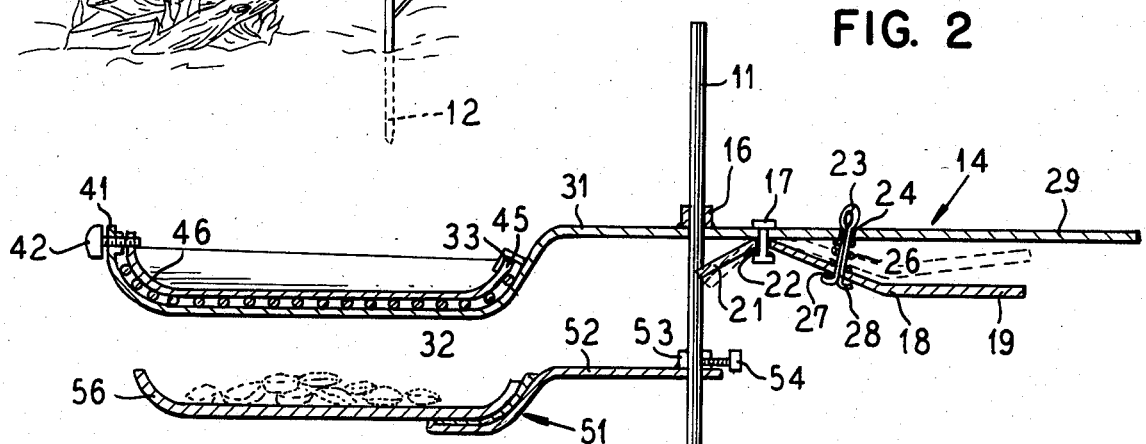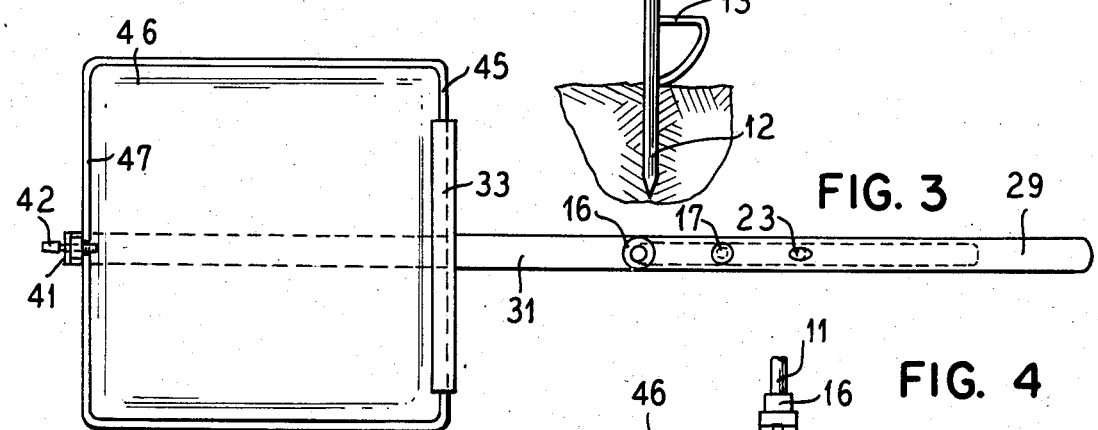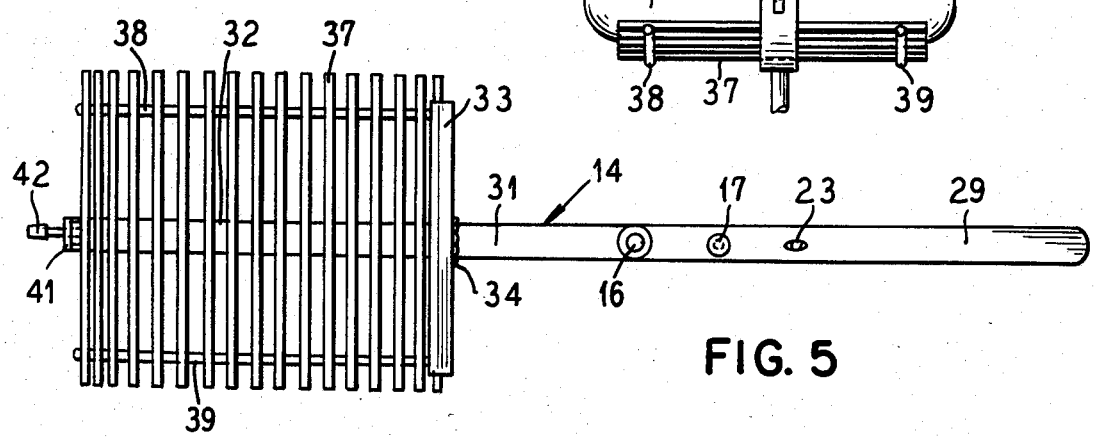

000
CAMPFIRE COOKING GRILL

BACKGROUND OF THE INVENTION

1. Field of the Invention

The present invention relates in general to cooking devices and in particular to a novel campfire griddle or grill.

2. Description of the Prior Art

Patents such as U.S. Pat. Nos. 3,095,869, 3,359,887, 4,117,825 and 2,844,139 disclose portable cooking stands and grills which can be used for picnics or other outside cooking.

SUMMARY OF THE INVENTION

The present invention comprises a supporting stake which has a foot pad so that it can be driven into the ground and then a griddle or grill member is placed over the stake and is provided with a locking handle with a safety latch for adjusting the grill or griddle to various heights on the stake. The grill is formed of parallel extending rods and is adapted to receive a griddle which can be attached thereto with a suitable thumb screw. The griddle or grill can be removed from the stake and used on a camp stove if desired. Also, a charcoal pan can be mounted on the supporting stake in which a fire of charcoal or other fuel is arranged after which the griddle or grill can be mounted on the stake so as to cook food where a campfire is not desired.

Other objects, features and advantages of the invention will be readily apparent from the following description of certain preferred embodiments thereof taken in conjunction with the accompanying drawings although variations and modifications may effected without departing from the spirit and scope of the novel concepts of the disclosure and in which:

BRIEF DESCRIPTION OF THE DRAWINGS

FIG. 1 is a perspective view of the griddle or grill of the invention;

FIG. 2 is a sectional view illustrating the invention;

FIG. 3 is a top plan view of the invention;

FIG. 4 is the end view illustrating the griddle mounted on the grill; and

FIG. 5 is a top view of the grill.

DESCRIPTION OF THE PREFERRED EMBODIMENTS

FIG. 1 illustrates a stake 11 which may be a metal stake with a sharp end 12 which can be inserted into the ground using a foot pad 13 which is attached to the stake. A combination of griddle or grill 14 comprises a handle portion 29 which is formed with an opening and sleeve 16 through which the upper end of the stake 11 can be inserted and has a handle 18 connected to the griddle handle 29 with a rivet 17 which passes through an opening formed in the handle and through an opening 22 formed in release handle 18 as illustrated in FIG. 2. The release handle 18 also is connected with a cotter key 23 and spring 26 to the handle 29. The cotter key passes through an opening 24 in the handle 29 and the spring 26 is mounted between the handle portion 29 and the release handle 18 and the cotter key 23 passes through an opening 27 and has its ends 28 spread so as to attach the handle flexibly to the handle 29. An engaging end 21 engages the stake 11 so as to lock the grill or griddle 14 at a selected position. To adjust the height of the grill or griddle 14, the end 19 of the locking handle 18 is moved toward the handle 29 as shown in dotted line position in FIG. 2 so that the end 21 would be released from the stake 11 allowing the grill or griddle 14 to be raised or lowered on the stake 11.

The grill or griddle 14 has an end 31 which has a curved portion 32 which supports a plurality of transverse grill members 37 as illustrated in FIG. 2 and FIG. 5 and reinforcing longitudinal members 38 and 39 are attached to the transverse members 37 so as to form a grill. A transverse angle member 33 is attached to the handle portion 31 of the grill 14 and is adapted to receive one end 45 of a griddle 46. A thumb screw 42 is threadedly received in a threaded opening in the end 41 of handle portion 32 and the end of thumb screw 42 engages the edge 47 of the griddle 46 to lock it to the grill as shown in FIGS. 2, 3 and 5.

A charcoal pan 51 illustrated in FIG. 2 is formed with a supporting member 52 which has a collar 53 which can be received over the stake 11 and through which a set screw 54 extends so as to lock the charcoal pan 51 at any desired position on the stake 11. The charcoal pan 56 is attached to the support 52 as illustrated in FIG. 2.

In use, the invention can be used either with or without the charcoal pan 51 and if used without the charcoal pan 51 the grill or griddle 14 would be supported over a cooking fire. The grill or griddle 14 can be used either with or without the griddle 46 and if the griddle 46 is not to be used the thumb screw 42 is loosened and the griddle 46 is removed to allow the invention to be used as a grill illustrated, for example, in FIG. 5.

When the invention is to be used as a griddle, the griddle 46 is mounted on the grill 14 with the edge 45 under the angle end 33 and the thumb screw 42 is tightened so as to lock the edge 47 of the grill 46 to the grill 14.

If it is desired to use the charcoal pan 51 it is placed over the stake 11 and the thumb screw 54 is tightened to adjust it to the proper height. Then the grill or griddle 14 is placed over the stake 11 and adjusted to the desired height by using the release handle 18.

The griddle can be swung away from the fire at will by rotating the grill and griddle 14 relative to the stake. The griddle 46 can be separately used by attaching it or removing it from the handle. The griddle can also be used by itself on a cook stove if desired. The angle iron clip 33 and the matching curve of the handle is a safety screw will hold the pan in place.

It is seen that this invention provides a new and novel combination griddle or grill and although it has been described with respect to preferred embodiments, it is not to be so limited as changes and modifications may be made therein which are within the full intended scope as defined by the appended claims.

We claim as our invention:

1. An outdoor cooking grill comprising a stake with a foot pad adapted to be inserted into the ground with the foot pad, a combination griddle and grill member including a support member formed with an opening receivable over said stake and with a first end which forms a handle, a grill attached to the other end of said support member, a transverse angle member attached to said support member adjacent said grill, a griddle attachable to said support with said angle, a handle locking lever pivotally attached to said support member and engageable with said stake and spring biased to a locked position and moveable to allow said support member to be moved vertically on said stake and wherein said grill is curved and said griddle has a similar curve so that it can be mounted on said grill and locking means to lock said grill to said griddle.

2. An outdoor cooking grill according to claim 1 including a charcoal pan, a charcoal pan support attached to said charcoal pan and formed with an opening through which said stake extends, and locking means for locking said charcoal pan support at selected positions on said stake.

3. An outdoor cooking grill according to claim 2 wherein said locking means for locking said charcoal pan support comprises a collar attached to said pan support and a set screw threadedly received through said collar and engageable with said stake.

* * * * *